United States Patent [19]
Kondo

[11] Patent Number: 5,995,537
[45] Date of Patent: Nov. 30, 1999

[54] SYNCHRONISM ACQUISITION METHOD AND APPARATUS FOR CORRELATION DEMODULATION

[75] Inventor: Takayuki Kondo, Tokyo, Japan

[73] Assignee: NEC Corporation, Tokyo, Japan

[21] Appl. No.: 08/821,925

[22] Filed: Mar. 21, 1997

[30] Foreign Application Priority Data

Mar. 22, 1996 [JP] Japan ................................. 8-066392

[51] Int. Cl.[6] .......................... H04B 15/00; H04K 1/00; H04L 27/30
[52] U.S. Cl. .................. 375/208; 375/206; 375/326; 370/515
[58] Field of Search .................... 375/200, 206, 375/208, 316, 343, 354, 362; 370/503, 506, 515

[56] References Cited

U.S. PATENT DOCUMENTS

| | | | |
|---|---|---|---|
| 4,426,662 | 1/1984 | Skerlos et al. | 358/194.1 |
| 4,774,715 | 9/1988 | Messenger . | |
| 4,970,523 | 11/1990 | Braisted et al. | 342/418 |
| 5,029,181 | 7/1991 | Endo et al. . | |
| 5,402,441 | 3/1995 | Washizu et al. | 375/208 |
| 5,402,450 | 3/1995 | Lennen | 375/343 |
| 5,414,729 | 5/1995 | Fenton | 375/209 |
| 5,550,811 | 8/1996 | Kaku et al. | 370/18 |
| 5,638,362 | 6/1997 | Dohi et al. | 370/342 |
| 5,654,979 | 8/1997 | Levin et al. | 375/206 |
| 5,809,064 | 9/1998 | Fenton et al. | 375/208 |
| 5,841,808 | 11/1998 | Rizzo et al. | 375/208 |
| 5,901,183 | 5/1999 | Garin et al. | 375/343 |
| 5,910,948 | 6/1999 | Shou et al. | 370/335 |

FOREIGN PATENT DOCUMENTS 3-3530   1/1991   Japan .

*Primary Examiner*—Chi H. Pham
*Assistant Examiner*—Bryan G. Webster
*Attorney, Agent, or Firm*—Sughrue, Mion, Zinn, Macpeak & Seas, PLLC

[57] ABSTRACT

A method for synchronism acquisition between a spread code sequence at a transmission side and a despread code sequence at a reception side in spread spectrum (SS) communication such as a direct sequence (DS). The method includes steps of (a) calculating correlation values for the despread code at different chip phases with successively displacing the chip phases of the despread code at intervals of 1/N chip over a full search range for the synchronism acquisition, N being an integer equal to or larger than 2, (b) selecting, as candidates, a plurality of chip phases which correspond to comparatively high values from among the correlation values, (c) adding, for each of the candidates, correlation values of chip phases adjacent the candidate to the correlation value of the candidate, and (d) determining one of the candidates which exhibits a highest result of addition as a chip phase having acquired synchronism.

9 Claims, 4 Drawing Sheets

SYNCHRONISM ACQUISITION METHOD AND APPARATUS FOR CORRELATION DEMODULATION

BACKGROUND OF THE INVENTION

1. Field of the Invention

This invention relates to a synchronism acquisition method and apparatus for use to correlation demodulate a spread code modulated by spread spectrum modulation.

2. Description of the Prior Arts

In spread spectrum (SS) communication based on a direct sequence (DS), an information code is spread modulated, on the transmission side, using a PN code sequence (pseudo-random noise code sequence, PN; pseudo-random noise) to produce a spread code and the spread code is transmitted. Then, on the reception side, the received signal is correlation demodulated (despread) using the same PN code sequence as that used on the transmission side to obtain an information code. The PN code sequence on the reception side is also called despread code. When a spread spectrum is used for communication, synchronism must be established between the PN code sequences of the transmission side and the reception side. However, since generally the generation timings of the PN code sequences on the transmission side and the reception side do not coincide with each other when communication is to be started, synchronism acquisition processing for synchronizing the PN code sequence on the reception side with the PN code sequence on the transmission side must be performed by the reception side upon starting of the communication. Here, the synchronism acquisition processing is processing which is performed at the reception side to estimate a generation timing of the PN code sequence on the transmission side with a predetermined degree of accuracy within one chip.

Also in a frequency hopping (FH) which is one of spread spectrum communication methods together with the direct sequence, synchronism acquisition processing must be performed upon starting of communication to establish synchronism between a frequency hopping sequence on the transmission side and a frequency hoping sequence on the reception side.

It is to be noted that processing for establishing synchronism between PN code sequences or frequency hopping sequences includes a synchronism acquisition process for establishing coarse synchronism which is described herein and a synchronism tracking process for establishing fine synchronism after the coarse synchronism is established and for finely adjusting the generation timing of a despread code sequence so that the established synchronism may not be lost.

A basic method of the synchronism acquisition process is a method of receiving a PN code sequence from the transmission side while successively varying the generation timing of a PN code sequence on the reception side little by little to effect correlation demodulation to find out a generation timing at which a high correlation value is obtained, that is, a sequence search method. With this method, however, a rather long time is required to acquire synchronism where the S/N (signal-to-noise ratio) of a transmission line is not high or a like case, and therefore, several techniques for performing synchronism acquisition processing at a high speed have been proposed. For example, Japanese Patent Laid-Open Application No. Hei 3-3530 (JP, A, 3-3530) by Y. Komatsu discloses a correlation demodulation apparatus wherein a primary search is performed for a full search range to find, as candidates, a plurality of chip phases which have relatively high correlation values and then a secondary search is performed to integrate the candidate chip phases by a plurality of times so that a chip phase synchronized with that of the transmission side can be found out in a comparatively short time.

FIG. 1 is a block diagram showing a construction of the correlation demodulation apparatus disclosed in above JP, A, 3-3530. The correlation demodulation apparatus shown in FIG. 1 includes three correlation detectors 2 to 4 to which a received signal 1 is inputted. The correlation demodulation apparatus further includes a clock generator 13 for generating a clock signal, a PN code generator 5 for generating a PN code sequence in response to the clock signal, and a shift register 6 for shifting the phase of the generated PN code sequence by +½ chip and −½ chip. The PN code sequence from the shift register 6 which has no displacement in phase is supplied to the correlation detector 2 while PN code sequences which are shifted by +½ chip and −½ chip in phase are supplied to the correlation detectors 3 and 4, respectively. The correlation detectors 3 and 4 are provided to effect synchronism tracking processing (fine synchronization). The correlation demodulation apparatus further includes reset integrators 7 to 9 provided on the output sides of the correlation detectors 2 to 4, respectively, registers 10 to 12 for holding the outputs of the reset integrators 7 to 9, respectively, and a controller 14 for controlling the entire apparatus.

In the conventional correlation demodulation apparatus shown in FIG. 1, synchronism acquisition processing is performed in the following manner. A PN code sequence is generated successively delaying it by one chip until a phase delay corresponding to one repetition period of a code sequence is produced, and the PN code sequence is inputted to the correlation detector 2 and correlation values (i.e., reception levels) then are calculated by the reset integrator 7 and successively stored into the register 10. In this manner, correlation values for one repetition period of the code sequence which individually correspond to the chip phases of the PN code sequence are stored into the register 10. Then, as the primary search, chip phases corresponding to the correlation values which have comparatively high values and are stored in the register 10 are selected as candidates. Next, as the secondary search, the correlation values are integrated with the phases corresponding to the candidates and it is determined that synchronism is acquired when the integrated value exceeds a predetermined determination level.

After the above synchronism acquisition processing, the correlation demodulation apparatus subsequently performs synchronism tracking processing.

With the conventional synchronism acquisition method which involves a primary search and a secondary search, since a primary search is first performed for a full synchronism acquisition range and then correlation detection and correlation integration are performed again, in order to raise the S/N ratio, for all candidates selected by the primary search to calculate correlation values to find out an optimum chip phase, there is a problem in that much time is required to establish chip synchronism. Further, since correlation values are calculated at the intervals of one chip for the full synchronism acquisition range, where a peak is present, for example, at a position spaced by ½ chip, this peak cannot be detected. Therefore, the conventional synchronism acquisition method has another problem in that a peak of a correlation value cannot be detected accurately for the full synchronism acquisition range.

SUMMARY OF THE INVENTION

It is a first object of the present invention to provide a synchronism acquisition method by which chip synchronism can be established with a high degree of accuracy in correlation demodulation, the time required for establishment of chip synchronism is reduced and the chip synchronism establishment ability is improved.

It is a second object of the present invention to provide a synchronism acquisition apparatus by which chip synchronism can be established with a high degree of accuracy in correlation demodulation, the time required for establishment of chip synchronism is reduced and the chip synchronism establishment ability is improved.

The first object of the present invention is achieved by a synchronism acquisition method for acquiring synchronism with a spread code in correlation demodulation, comprising steps of calculating correlation values for a despread code at different chip phases with successively displacing the chip phases of the despread code at intervals of 1/N chip over a full search range for the synchronism acquisition, N being an integer equal to or larger than 2, selecting, as candidates, a plurality of chip phases which correspond to comparatively high values from among the correlation values, adding, for each of the candidates, correlation values of chip phases adjacent the candidate to the correlation value of the candidate, and determining one of the candidates which exhibits a highest result of addition as a chip phase having acquired synchronism.

The second object of the present invention is achieved by a synchronism acquisition apparatus for acquiring synchronism with a spread code in correlation demodulation, comprising, despread code generation means for generating a despread code, correlation calculation means for calculating correlation values between a received signal and the despread code, phase shifting means for supplying the despread code to the correlation means with successively displacing chip phases of the despread code at intervals of 1/N chip over a full search range for synchronism acquisition, N being an integer equal to or larger than 2, storage means for storing the correlation values at the chip phases, and chip phase search means for referring to the storage means to select a plurality of chip phases which correspond to comparatively high values from among the correlation values as candidates, adding, for each of the candidates, correlation values of chip phases adjacent the candidate to the correlation value of the candidate, and determining one of the candidates which exhibits a highest result of addition as a chip phase having acquired synchronism.

In the present invention, when synchronism acquisition is to be performed using two processes of a primary search and a secondary search, the synchronism acquisition of a spread code in the primary search is performed not at the intervals of one chip, but at the intervals of 1/N chip (N is an integer equal to or larger than 2) smaller than that, thereby to realize synchronism acquisition with a higher degree of accuracy. Further, in the present invention, since correlation integrated values of the primary search are used in the secondary search for raising the S/N ratio, the necessity for new correlation detection for the secondary search is eliminated, and consequently, the secondary search can be performed at a higher speed. Due to the characteristics described, according to the present invention, synchronism acquisition processing can be performed at a high speed and with a high degree of accuracy.

In the present invention, the integer N typically is 4, and where N=4, preferably the chip phases which are adjacent the candidate and to be used for adding to the correlation values of the candidate are a chip displaced in phase by ¼ chip and another chip displaced in phase by –¼ chip from the candidate.

FIG. 2 shows an example of a delay profile indicating a variation in correlation value with respect to the delay amount of the despread code. Referring to FIG. 2, point A is a chip phase at which the highest correlation value is exhibited when correlation values are calculated at the intervals of 1 chip, and point B is a chip phase at which the highest correlation value is exhibited when correlation values are calculated at the intervals of ¼ chip. Since the correlation value at point B may possibly be higher than the correlation value at point A but does not become lower than the correlation value at point A, it can be recognized that the detection of the highest value of the correlation value at the intervals of ¼ chip can detect a chip phase of a higher correlation component with a higher degree of accuracy than the detection of the highest value of the correlation value at the intervals of one chip.

Further, by adding, to the correlation value of the chip phase at which the highest correlation value is exhibited, correlation values of chip phases each displaced by an amount smaller than one chip on the opposite sides of the chip phase of the highest correlation component, for example, by ±¼ chip, the S/N of the correlation component can be augmented, and the accuracy in synchronism acquisition is improved. FIG. 3 is a graph showing a typical correlation characteristic and indicates that the correlation components of the chip phases displaced by ±¼ chip from the center phase amount to 75% of the correlation component of the center phase. Meanwhile, where a high correlation value is obtained unexpectedly because of noise or the like, it is considered that the correlation value at a chip phase adjacent by less than one chip is significantly smaller than the correlation component affected by the noise or the like. Accordingly, by adding correlation values of chips adjacent the center phase by less than one chip, the S/N of the correlation component is augmented, and accurate synchronism acquisition can be performed.

The above and other objects, features and advantages of the present invention will become apparent from the following description when taken in conjunction with the accompanying drawings which illustrate a preferred embodiment of the present invention by way of an example.

DESCRIPTION OF THE PREFERRED EMBODIMENT

Figure 1:
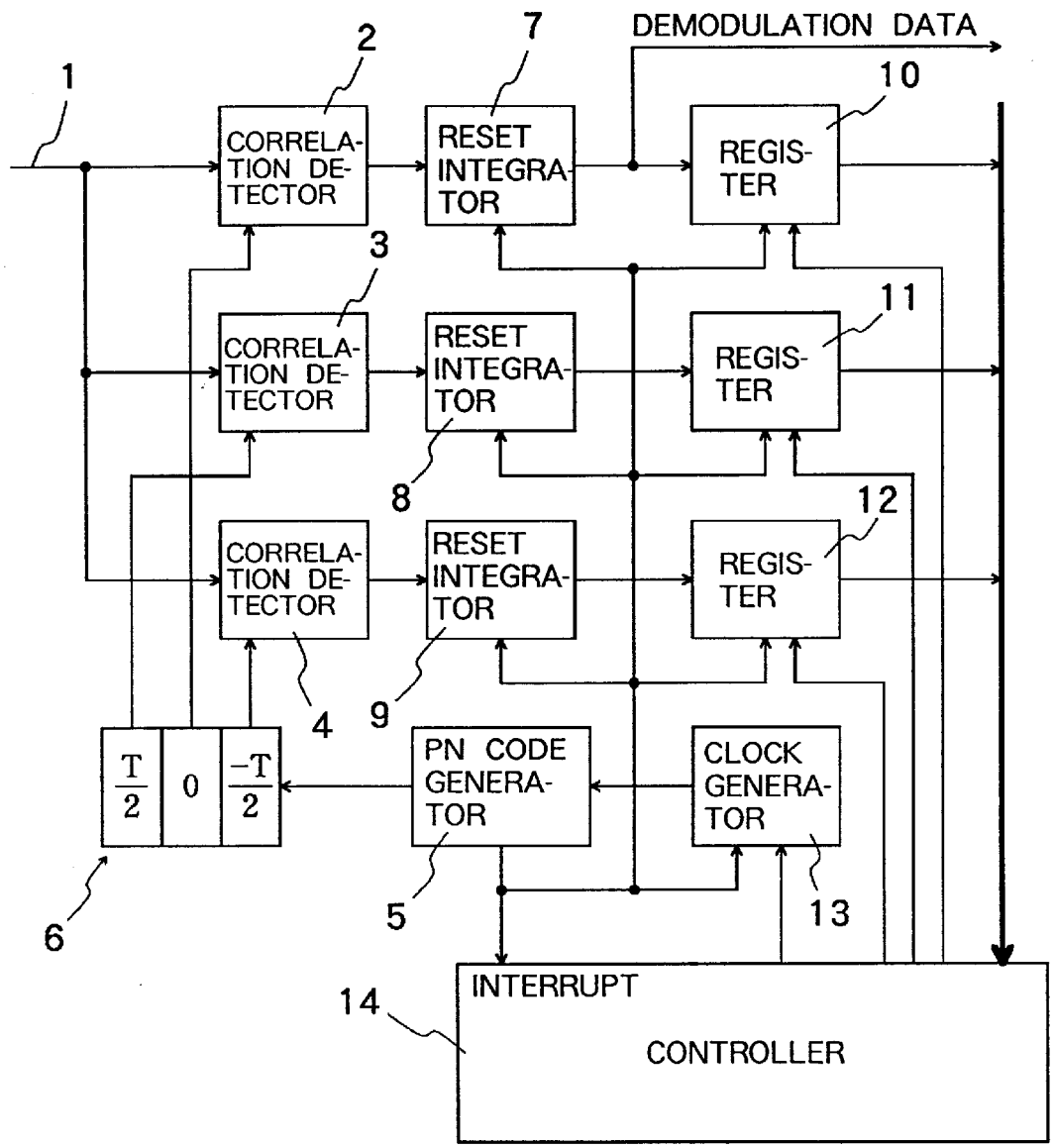
FIG. 1 is a block diagram showing an example of a construction of a conventional correlation demodulation apparatus.
Figure 2:
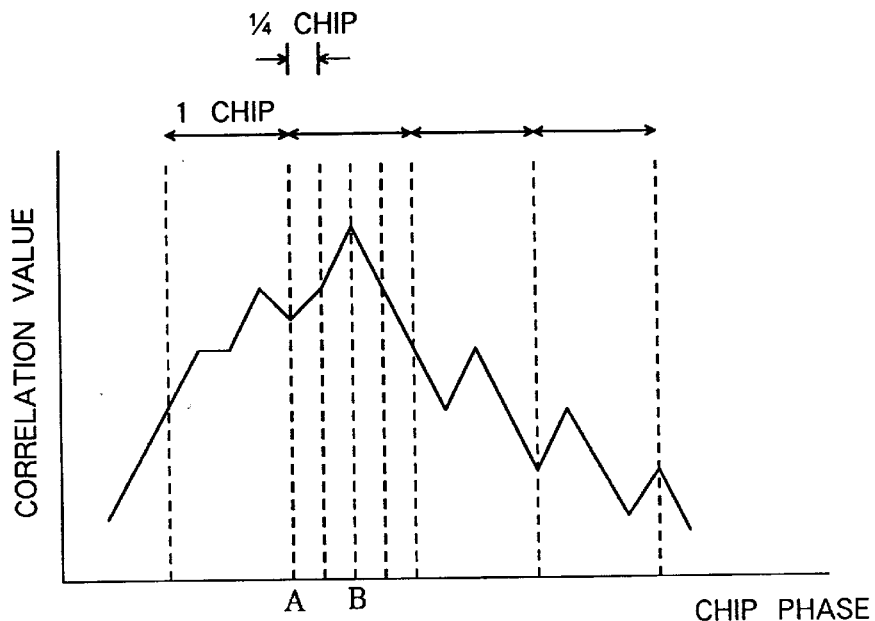
FIG. 2 is a graph showing an example of a delay profile.
Figure 3:
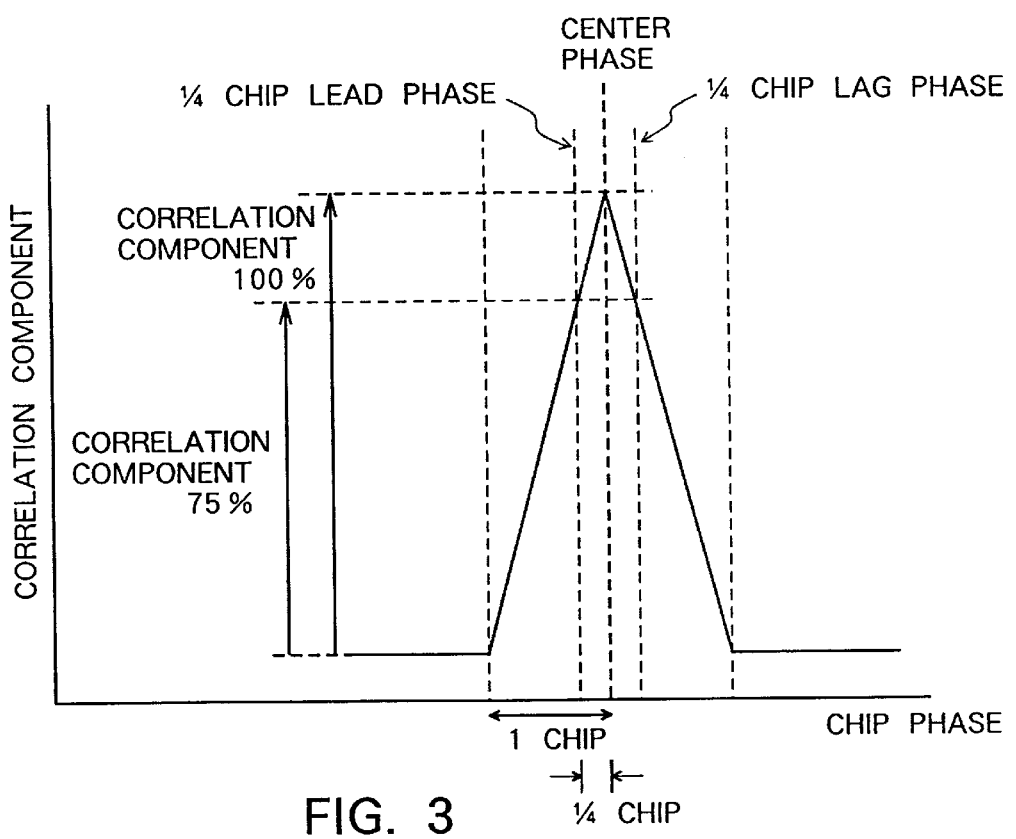
FIG. 3 is a graph illustrating an example of a correlation characteristic.
Figure 4:
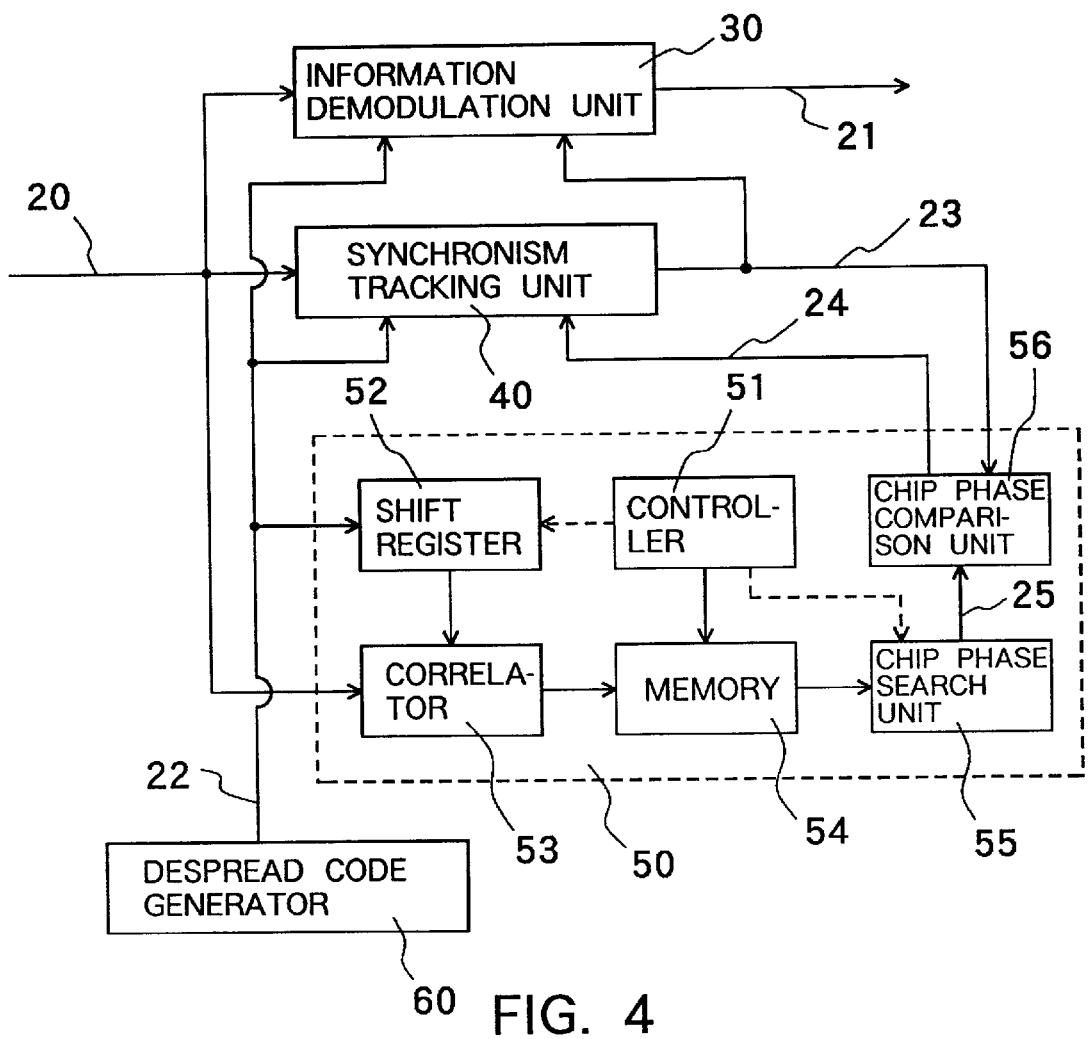
FIG. 4 is a block diagram showing a construction of a correlation demodulation apparatus of a preferred embodiment of the present invention.

The synchronism acquisition method of the present invention is applied to a correlation demodulation apparatus of a preferred embodiment of the present invention shown in FIG. 4. Here, a direct sequence is used as a spread spectrum method, and the correlation demodulation apparatus is constructed so as to correlation demodulate a spread code by spread modulation.

The present correlation demodulation apparatus includes a despread code generator 60 for generating a PN code sequence as a despread code 22, an information demodulation unit 30 for receiving a received signal 20 and the despread code 22 as inputs thereto and demodulating (despreading) the received signal 20 by correlation demodulation into demodulation data 21 to be outputted, a synchronism tracking unit 40 for receiving the received signal 20 and the despread code 22 as inputs thereto and performing synchronism tracking processing, and a synchronism acquisition unit 50 for receiving the received signal 20 and the despread code 22 as inputs thereto and performing synchronism acquisition processing. A chip phase 23 tracked by the synchronism tracking unit 40 is supplied from the synchronism tracking unit 40 to the information demodulation unit 30 and the synchronism acquisition unit 50.

The synchronism acquisition unit 50 includes (a) a controller 51 for controlling the entire synchronism acquisition unit 50, (b) a shift register 52 for successively displacing the despread code 22 at the intervals of ¼ chip under the control of the controller 51, (c) a correlator 53 for calculating a correlation value between the despread code having a phase displaced by the shift register 52 and the received signal 20, (d) a memory 54 for storing correlation values successively calculated by the correlator 53, (e) a chip phase search unit 55 for searching a chip phase, and (f) a chip phase comparison unit 56 for comparing a chip phase 25 searched out by the chip phase search unit 55 with the chip phase 23 being tracked by the synchronism tracking unit 40. The chip phase comparison unit 56 outputs a chip phase 24 acquired by the synchronism acquisition unit 50 in response to a result of the comparison. The chip phase search unit 55 retrieves high values from among the correlation values stored in the memory 54 and obtained while successively displacing the despread code at the intervals of ¼ chip, determines chip phases corresponding to the high correlation values as candidates, adds, for each of the candidates, correlation values of two chip phases displaced by ±¼ chip from the candidate to the correlation value of the chip phase of the candidate and determines one of the candidates which exhibits the highest result of addition as a chip phase which has acquired synchronism. Here, while the shift register 52 serves as phase shifting means, a delay element or a like element other than a shift register may be used alternatively for the phase shifting means.

Figure 5:
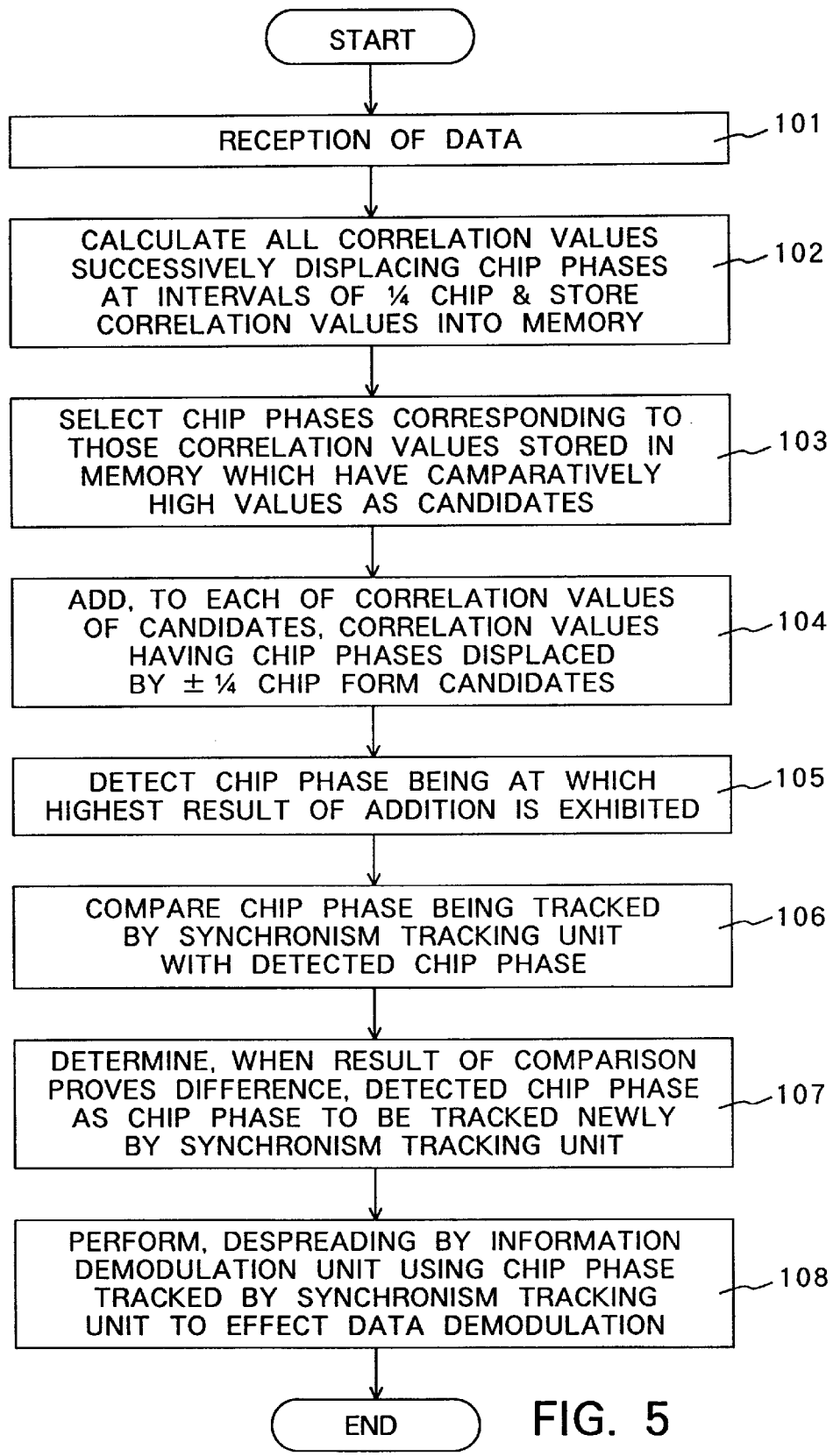
FIG. 5 is a flow chart illustrating processing by the correlation demodulation apparatus shown in FIG. 4.

Next, correlation demodulation processing of the correlation demodulation apparatus is described with reference to the flow chart of FIG. 5 placing a stress on synchronism acquisition processing.

First in step 101, the received signal 20 is inputted to the information demodulation unit 30, synchronism tracking unit 40 and synchronism acquisition unit 50 while the despread code 22 is inputted from the despread code generator 60 to the information demodulation unit 30, synchronism tracking unit 40 and synchronism acquisition unit 50. In the synchronism acquisition unit 50, the despread code 22 is inputted to the shift register 52, and the controller 51 controls the shift register 52 so that the chip phases of the despread code 22 may be successively displaced at the intervals of ¼ chip within the full search range. The despread code having chip phases displaced in this manner is inputted to the correlator 53 together with the received signal 20. As a result, the correlator 53 calculates the correlation values of the despread code and the received signal 20 with the chip phases when successively displaced at the intervals of ¼ chip over the full search range. The correlation values thus calculated are stored into the memory 54 as seen from step 102.

After the correlation values at the chip phases successively displaced at the intervals of ¼ chip are calculated and stored into the memory 54 in this manner, the chip phase search unit 55 selects, as a primary search in step 103, the chip phases of those of the correlation values stored in the memory 54 which have comparatively high values as candidates. The number of the candidates is usually a plural number, and a correlation value can be selected as a candidate, for example, where it is higher than a predetermined value. Or, a predetermined plural number of chip phases which have higher correlation values than the others may be selected as the candidates.

Then, the chip phase search unit 55 adds, in step 104, correlation values of two chip phases displaced by ±¼ from the chip phase of each of the candidates to the correlation value of the chip phase of the candidate. Then, in step 105, as a secondary search, the chip phase search unit 55 detects that chip phase which exhibits the highest value from among results of the addition, and determines the detected chip phase as the chip phase 25 searched out by the chip phase search unit 55.

The chip phase 25 searched out by the chip phase search unit 55 is inputted, in step 106, to the chip phase comparison unit 56. Consequently, the chip phase comparison unit 56 compares the chip phase 23 being tracked by the synchronism tracking unit 40 with the chip phase 25 searched out by the chip phase search unit 55. Where the two chip phases 23 and 25 are different from each other, the chip phase 25 searched out by the chip phase search unit 55 is reported, in step 107, as the chip phase 24 acquired by the synchronism acquisition unit 50 to the synchronism tracking unit 40. As a result, the synchronism tracking unit 40 performs synchronism tracking based on the chip phase 24 acquired by the synchronism acquisition unit 50. Then, the information demodulation unit 30 despreads, in step 108, the received signal 20 based on the chip phase 23 synchronism acquired in this manner and being tracked by the synchronism tracking unit 40 to effect data demodulation, and outputs demodulation data 21.

By the processing described above, the synchronism acquisition processing and the synchronism tracking processing are performed to effect correlation demodulation of the received signal.

In the present embodiment, correlation integrated values obtained by the primary search are used to eliminate the necessity for correlation detection in the secondary search to allow high speed operation of the secondary search. Meanwhile, in order to effect synchronism acquisition, which is based on the conventional synchronism acquisition method, similar to that of the present embodiment correlation detection for chip phases of candidates must be performed further by a plurality of times, for example, twice where correlation values of chip phases successively displaced by ±¼ chip from center phases are to be added to correlation values of the center phases.

While the present invention is described above in connection with a direct sequence (DS), it would be apparent to one skilled in the art that the method of the present invention can be applied to spread spectrum communication by a frequency hopping (FH) wherein synchronism of a frequency hopping pattern of the transmission side is acquired on the reception side.

The foregoing embodiment should be construed as merely illustrative of the present invention and not as limiting the invention specifically thereto. It will be apparent that many modifications and variations may be effected without departing from the scope of the appended claims.

What is claimed is:

1. A synchronism acquisition method for acquiring synchronism with a spread code in correlation demodulation, comprising steps of:

calculating correlation values for a despread code at different chip phases with successively displacing the chip phases of the despread code at intervals of 1/N chip over a full search range for the synchronism acquisition, N being an integer equal to or larger than 2;

selecting, as candidates, a plurality of chip phases which correspond to comparatively high values from among the correlation values;

adding, for each of the candidates, correlation values of chip phases adjacent the candidate to the correlation value of the candidate; and determining one of the candidates which exhibits a highest result of addition as a chip phase having acquired synchronism.

2. The synchronism acquisition method according to claim 1, wherein the spread code and the despread code are pseudo-random noise code sequences in spread spectrum communication by a direct sequence.

3. The synchronism acquisition method according to claim 1, wherein N is 4, and the chip phases adjacent the candidate are a chip phase displaced by ¼ chip and another chip phase displaced by -¼ chip from the candidate.

4. A synchronism acquisition method as claimed in claim 2, wherein N is 4, and the chip phases adjacent the candidate are a chip phase displaced by ¼ chip and another chip phase displaced by -¼ chip from the candidate.

5. A synchronism acquisition apparatus for acquiring synchronism with a spread code in correlation demodulation, comprising:

despread code generation means for generating a despread code;

correlation calculation means for calculating correlation values between a received signal and the despread code;

phase shifting means for supplying the despread code to the correlation means with successively displacing chip phases of the despread code at intervals of 1/N chip over a full search range for synchronism acquisition, N being an integer equal to or larger than 2;

storage means for storing the correlation values at the chip phases; and chip phase search means for referring to the storage means to select a plurality of chip phases which correspond to comparatively high values from among the correlation values as candidates, adding, for each of the candidates, correlation values of chip phases adjacent the candidate to the correlation value of the candidate, and determining one of the candidates which exhibits a highest result of addition as a chip phase having acquired synchronism.

6. The synchronism acquisition apparatus according to claim 5, wherein the despread code is a pseudorandom noise code sequence in spread spectrum communication by a direct sequence.

7. The synchronism acquisition apparatus according to claim 5, wherein N is 4, and the chip phases adjacent the candidate are a chip phase displaced by ¼ chip and another chip phase displaced by -¼ chip from the candidate.

8. The synchronism acquisition apparatus according to claim 6, wherein N is 4, and the chip phases adjacent the candidate are a chip phase displaced by ¼ chip and another chip phase displaced by -¼ chip from the candidate.

9. The synchronism acquisition apparatus according to claim 5, wherein the phase shifting means is a shift register.

* * * * *